United States Patent [19]

Kretschmer

[11] 4,416,549
[45] Nov. 22, 1983

[54] APPARATUS FOR AGITATING AND PUMPING A LIQUID SLURRY

[75] Inventor: Stephen L. Kretschmer, Elk Grove Village, Ill.

[73] Assignee: A. O. Smith Harvestore Products, Inc., Arlington Heights, Ill.

[21] Appl. No.: 327,792

[22] Filed: Dec. 7, 1981

[51] Int. Cl.³ .......................... B01F 7/16; B01F 15/00
[52] U.S. Cl. .................................. 366/190; 366/264; 366/282; 366/286
[58] Field of Search ............... 366/241, 242, 244, 251, 366/253, 261, 262, 264, 281, 282, 285, 286, 249, 254, 347, 190; 248/669; 296; 285/325; 74/89.15; 114/111, 112; 403/356, 101, 109

[56] References Cited

U.S. PATENT DOCUMENTS

| Re. 17,683 | 5/1930 | Craddock | 366/286 |
|---|---|---|---|
| 936,886 | 10/1909 | Hannold | 285/90 X |
| 1,864,149 | 6/1932 | Rockwell | 366/266 |
| 2,157,683 | 5/1939 | Vollrath | 366/286 X |
| 2,517,648 | 8/1950 | Franke | 366/347 |
| 3,805,891 | 4/1974 | Reinhard et al. | 285/325 X |
| 3,877,677 | 4/1975 | Daghe et al. | 74/89.15 X |
| 4,358,298 | 11/1982 | Ratcliff | 366/262 |

FOREIGN PATENT DOCUMENTS

| 1188345 | 3/1965 | Fed. Rep. of Germany | 366/262 |
|---|---|---|---|
| 2420605 | 6/1975 | Fed. Rep. of Germany | 366/263 |

Primary Examiner—Philip R. Coe
Assistant Examiner—Thomas W. Epting
Attorney, Agent, or Firm—Andrus, Sceales, Starke & Sawall

[57] ABSTRACT

An apparatus for agitating and pumping a liquid slurry, such as liquid manure slurry. The apparatus includes a pump which is adapted to be positioned within the lower end of a pit that contains the slurry, and the pump is operably connected to a motor which is located above the pit. The motor-pump unit is mounted for sliding vertical movement on a fixed column and can also be rotated horizontally relative to the column to vary the position of the outlet of the pump during agitation of the slurry. The apparatus also includes a means for tilting the motor-pump unit with respect to the fixed column. When the pump is raised to a location adjacent the top of the pit, the motor-pump unit can be tilted in a vertical plane to move the pump out of the pit to a position where it can be repaired or maintained.

12 Claims, 12 Drawing Figures

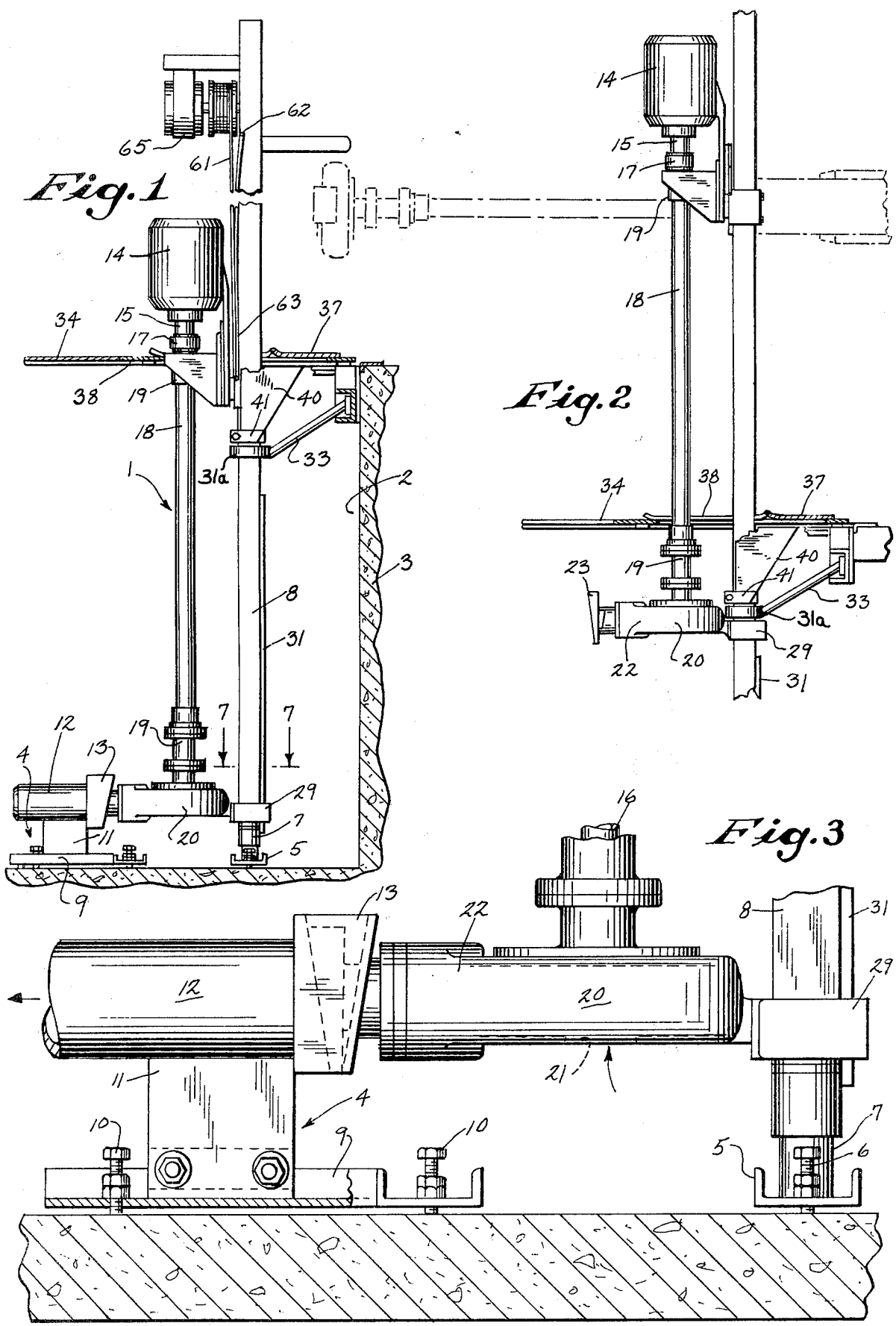

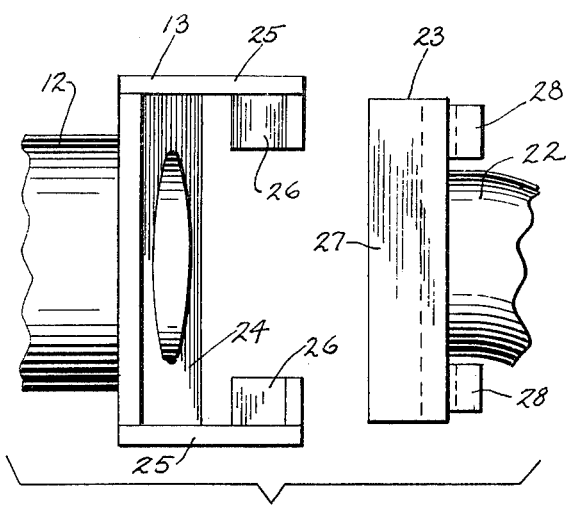
Fig.4
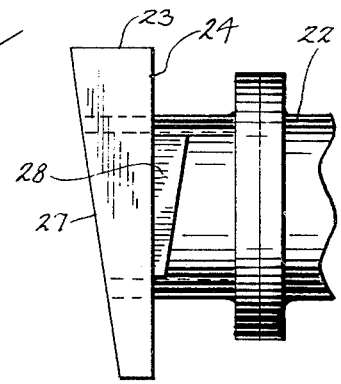
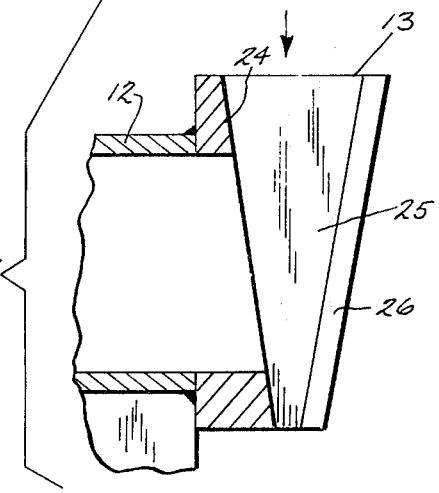
Fig.5
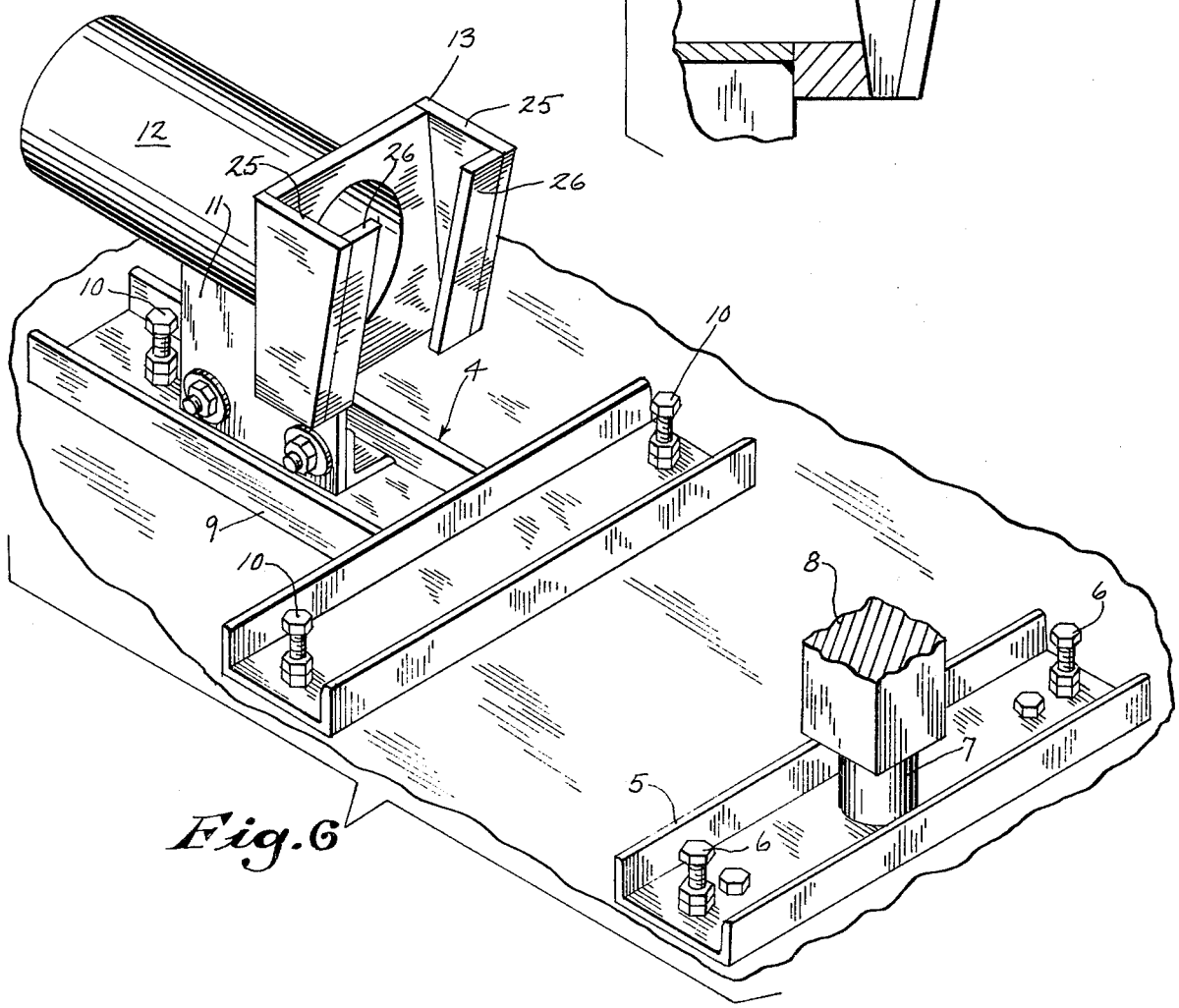
Fig.6

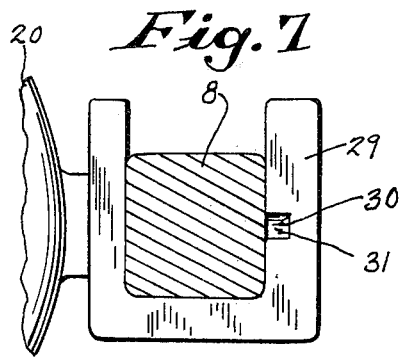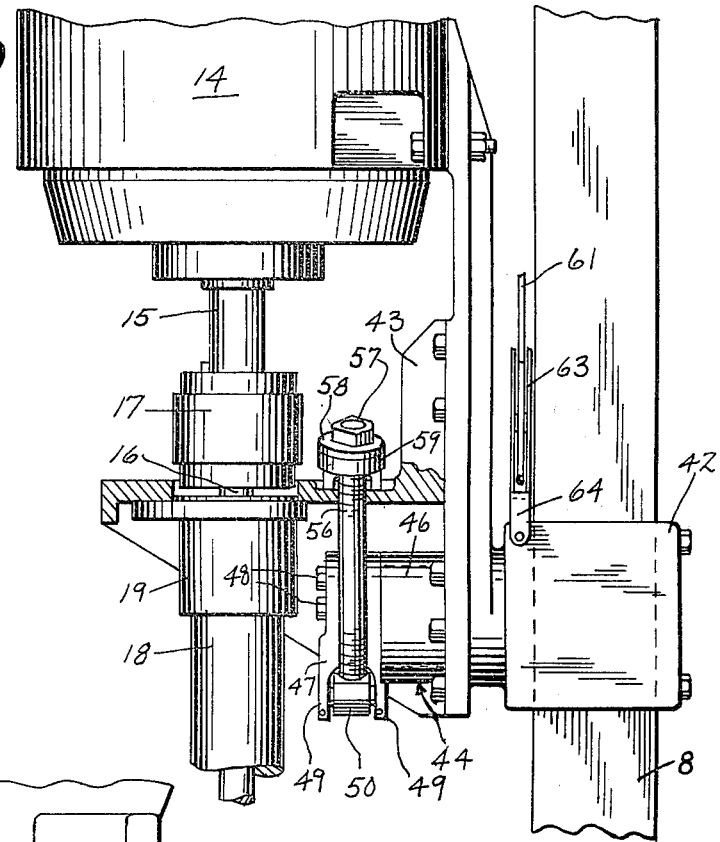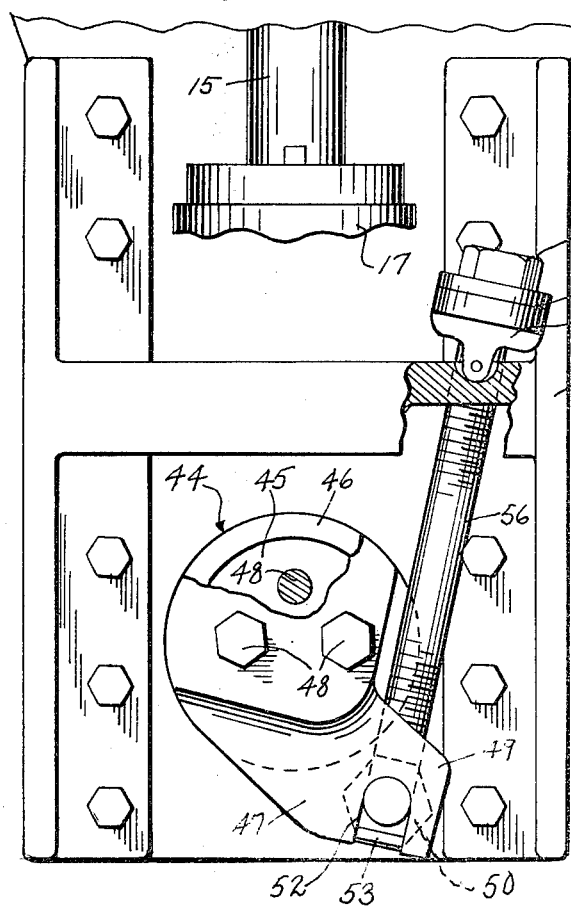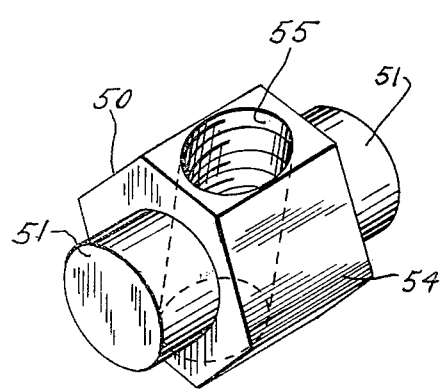

APPARATUS FOR AGITATING AND PUMPING A LIQUID SLURRY

BACKGROUND OF THE INVENTION

In a conventional liquid manure system, manure is delivered by barn cleaners, or other conveying apparatus, to a below ground pit adjacent the barn or other livestock feed area. The manure slurry contains materials of different densities and the lighter weight fibrous materials tend to rise to the top of the slurry, while the heavier solids will settle to the bottom. In the conventional system, a pump is located in the pit and by raising and lowering the pump within the pit and rotating the pump, the discharge of the pump can be directed to all areas of the pit to mix or homogenize the liquid manure slurry. When it is desired to discharge the slurry from the pit, the pump is lowered to a position where the outlet of the pump is automatically connected to a discharge pipe, and operation of the pump will then discharge the liquid slurry through the discharge pipe to a storage tank or other discharge site.

Many of the conventional manure pumping systems utilize a submersible motor to drive the pump. As the motor is submerged in the liquid slurry, special precautions must be taken to seal the motor which increases the overall cost of the system.

Other liquid manure systems employ a motor which is located above the pit, out of contact with the slurry, and is connected through a long vertical drive shaft to the pump. As the pit may have a depth of 4 to 8 feet, the removal of the pump from the pit for routine maintenance or repair can be a difficult operation.

SUMMARY OF THE INVENTION

The invention is directed to an improved agitating and pumping system for a liquid slurry, having particular application for use with liquid manure slurry. In accordance with the invention, the pump, which is located within the pit that contains the slurry, is operably connected through a vertical drive shaft to a motor which is positioned above the pit and out of contact with the liquid slurry. The motor-pump unit is mounted for sliding vertical movement within the pit on a fixed column and in addition, the motor-pump unit can be rotated horizontally about the column. With this arrangement, the pump can be raised and lowered within the pit, as well as rotated, to thereby direct the discharge of the pump to all areas of the pit to thoroughly mix or homogenize the slurry.

To facilitate raising and lowering the motorpump unit within the pit, an electric winch mechanism can be utilized.

As a feature of the invention, the motor-pump unit is mounted for tilting movement about a horizontal axis. When the pump is raised to a position adjacent the upper end of the pit, the motor-pump unit can then be pivoted or tilted vertically to move the pump to a level above the pit. The unit can then be rotated horizontally and lowered onto the ground to a position where the pump can be readily repaired or maintained.

A mechanism can also be incorporated to mechanically tilt the motor-pump unit with respect to the fixed column. In this regard, a guide member is mounted for sliding movement on the fixed column and the motor-pump unit is connected to the guide member through a horizontal trunion. One of the trunion members carries a crank arm which is operably connected to a lead screw. By threading down the lead screw through use of a wrench, the crank arm will be rotated to thereby tilt the motor-pump unit with respect to the guide member.

Other objects and advantages will appear in the course of the following description.

DESCRIPTION OF THE DRAWINGS

The drawings illustrate the best mode presently contemplated of carrying out the invention.

In the drawings:

FIG. 1 is a side elevational view of the apparatus of the invention as installed in a pit, with the motor-pump unit in a lowered operating position;

FIG. 2 is a view similar to FIG. 1 showing the motor-pump unit in an upper position;

FIG. 3 is an enlarged side elevational view of the pump in its lower position;

FIG. 4 is an exploded top view showing the connection between the pump outlet and the discharge pipe;

FIG. 5 is a vertical section showing the connection between the pump outlet and the discharge pipe;

FIG. 6 is a perspective view of the base structure of the apparatus;

FIG. 7 is a section taken along line 7—7 of FIG. 1;

FIG. 10 is an enlarged side elevational view showing the tilting connection of the motor-pump unit;

FIG. 11 is a view taken along line 11—11 of FIG. 10; and

FIG. 12 is a perspective view of the nut for the lead screw.

DESCRIPTION OF THE PREFERRED EMBODIMENT

Figure 8:
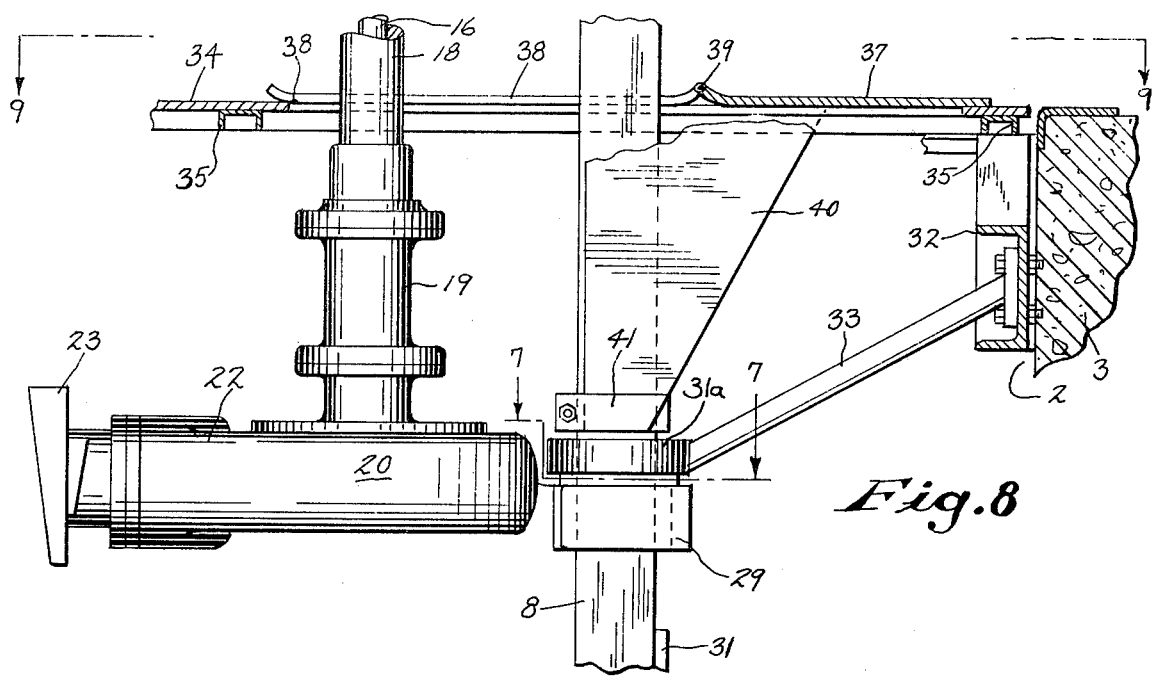
FIG. 8 is an enlarged side elevational view with parts broken away showing the pump in its raised position in the pit.

The drawings illustrate an apparatus 1 for agitating and pumping a liquid slurry, such as liquid manure slurry. The apparatus 1 is mounted within a pit 2 formed in the ground 3 or other foundation.

The apparatus 1 includes a base 4 or supporting structure which is mounted on the bottom of the pit. Base 4 includes a channel 5 having a pair of levelling screws 6 which engage the bottom of the pit and can be used to level the channel 5. Extending upwardly from the central portion of channel 5 is a post 7, and the lower end of a generally square column 8 is journalled for rotation on the post 7.

Base 4 also includes a T-member 9 formed of channel sections, and a series of levelling screws 10 are mounted in the T-member to level the same on the floor of the pit. A vertical support plate 11 extends upwardly from the stem portion of the T-member 9 and supports a generally horizontal pipe section 12 having an enlarged end 13. The pipe section 12 is connected through a suitable piping system to an above ground manure storage tank, or to a suitable discharge conduit through which the slurry can be transferred to a mobile spreading unit.

The apparatus 1 includes an electric motor 14 which is located above the pit and the vertical drive shaft 15 of the electric motor is connected to a vertical shaft 16 through a flexible coupling 17. Drive shaft 16 is mounted within an outer tube 18, and the tube 18 contains bearing assemblies 19 which journal the shaft 16 for rotation.

The lower end of the vertical shaft 16 is operably connected to the impeller, not shown, of a pump 20. Pump 20 is provided with a downwardly facing axial inlet 21 through which the slurry is introduced into the pump, and the slurry is discharged through a tangential outlet 22 which terminates in an end 23.

To agitate the slurry within the pit 2, the pump and motor unit is adapted to be moved vertically within the pit as well as roated, as will be hereinafter described, so that the discharge outlet 22 of the pump can direct the slurry to all areas of the pit to thoroughly mix the slurry. When it is desired to pump the slurry from the pit, the pump 20 is lowered to a position where the end 23 of the outlet 22 will automatically be placed into registry with the end 13 of the discharge pipe section 12.

To provide this connection, the end 13 of the pipe section 12 is provided with an inclined or wedge-shaped surface 24. Side members 25 extend outwardly from surface 24 and carry a pair of inclined edge members 26. The end 23 of the pump outlet is similarly formed with a wedge-shaped or inclined surface 27 which mates with the surface 24. In addition, a pair of tapered ears 28 are formed on the rear portion of end 23 and ride against the inclined edge members 26, as the pump is lowered. The angularity of the surfaces 24 and 27 enables the end 23 to be automatically brought into registry with the end section 13 as the pump is lowered, so that on operation of the pump the slurry will be discharged through outlet 22 to the pipe section 12.

During agitation of the slurry, the pump 20 and motor 14 are adapted to be moved vertically as a unit within the pit, and to guide the unit in vertical movement a generally C-shaped bracket 29 is attached to the end of the pump opposite the discharge outlet 22. Bracket 29 surrounds the column 8 and is provided with a groove or key-way 30, that receives an outwardly extending key 31 formed on the column 8. Engagement of the key 31 with key-way 30 will act to guide the pump in vertical movement on the column 8.

As best shown in FIG. 2, the key-way 30 terminates below the uppermost position of the pump, so that when the pump is in its uppermost position, the key 31 will be disengaged from the key-way 30, thereby enabling the pump and motor unit to be pivoted or tilted relative to the column 8, as will be hereinafter described.

Figure 9:
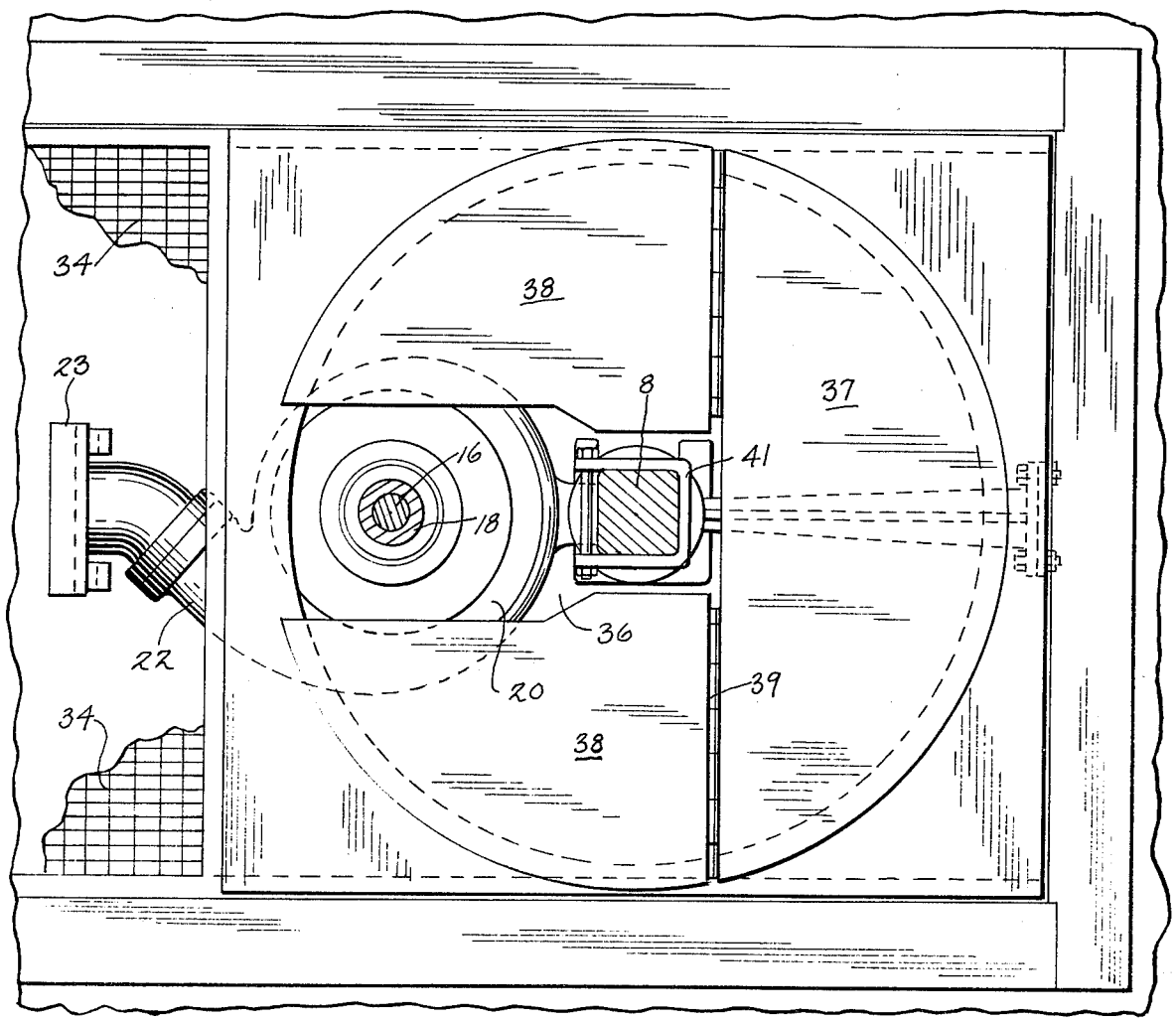
FIG. 9 is a view taken along line 9—9 of FIG. 8.

As previously noted, the column 8 can be rotated manually about the supporting post 7 and rotation of the column 8 will correspondingly rotate the pump 20. Column 8 is supported for rotation within a bearing 31a which is supported from frame 32 located at the upper end of the pit by a pair of braces 33. The open upper end of the pit 2 is normally closed by a grating 34, which is supported by a series of edge channels 35 mounted to the frame 32. The central portion of the grating 34, as best shown in FIG. 9, is provided with an opening 36 which is enclosed by a rotatable cover 37 and a pair of hinged cover sections 38 which are hinged to the cover 37 by hinge 39. As best illustrated in FIG. 9, the cover sections 38 are spaced apart and the column 8, as well as the tube 18, extend within the space between the spaced cover sections.

As shown in FIG. 8, a housing 40 is connected to the undersurface of the cover 37 and the lower end of the housing is attached through a collar 41 to the column at a location above the bearing 31. With this construction, rotation of the column 8 about post 7 will correspondingly result in rotation of the cover 37 and cover sections 38 relative to the grating 34.

The upper portion of the motor-pump unit is guided for vertical sliding movement on column 8 by a guide member 42, which projects outwardly from an H-shaped bracket 43 carried by the upper end of tube 18. The guide member 42 is interconnected with the bracket 43 through a trunion 44 which enables the motor-pump unit to be tilted or pivoted in a vertical plane relative to the guide 42 and column 8.

As best shown in FIGS. 10 and 11, trunion 44 includes a generally cylindrical male member 45 which projects outwardly from the guide 42 and is received within a socket 46 formed in the bracket 43. With this connection, the bracket 43, as well as the motor-pump unit which is connected to the bracket, can be swung in a vertical plane about the column 8.

As the motor-pump unit has substantial weight it may be desirable to incorporate a mechanism for tilting the motor-pump unit with respect to the column 8. In this regard, the mechanism for tilting the motor-pump unit is best illustrated in FIGS. 10-11. As shown in FIG. 11, a crank arm 47 is located within the lower arms of H-shaped bracket 43 and is connected to the end of the male trunion member 45 through a series of bolts 48. The lower end of crank arm 47 is provided with a pair of spaced legs 49 and a nut 50 is mounted between the legs. As best illustrated in FIG. 12, nut 50 is formed with a pair of ends 51 of reduced diameter which are received within slots 52 in the legs 49 of the crank arm. Pins 53 serve to retain the ends 51 within the slots 52.

The central enlarged portion 54 of the nut 50 is provided with a central threaded hole 55 which receives a threaded lead screw 56. The upper end of lead screw 56 is provided with a head 57 which bears against a thrust bearing 58 carried by pivotable bearing support 59 that is pivoted to the bracket 43. Through use of a wrench applied to head 57, the lead screw can be rotated to thereby rotate the crank arm 47 about the axis of the trunion. As the crank arm 47 is fixed to the male trunion member 45, which in turn is attached to the non-rotatable guide 42, threading of the lead screw 56 within the nut 50 will cause the socket member 46 and bracket 43, which carries the motor-pump unit, to rotate relative to the column 8 and thereby tilt the motor-pump unit in a vertical plane.

In order to manually rotate the column and the motor-pump unit within the pit 2, a generally L-shaped handle 60 extends outwardly from the outer end of the column 8, as best shown in FIG. 2.

As previously mentioned, the motor-pump unit is raised and lowered within the pit to agitate the slurry. As the motor-pump unit has considerable weight, a winch and cable mechanism can be incorporated to provide this function. As shown in FIG. 2, one end of a cable 61 is dead-ended at 62, adjacent the upper end of the column 8. The cable extends downwardly over a pulley 63 supported by bale 64 attached to the guide 42, as shown in FIG. 10, and the cable 61 then extends upwardly and is wound on an electric winch 65 supported from the upper end of the column 8. By operation of the winch 65, the motor-pump unit can be conveniently raised and lowered in the pit to agitate the slurry.

Except in its extreme uppermost position, the motor-pump unit will be connected to the column 8, so that rotation of the column 8 through operation of the handle 60 will rotate the pump 20 within the pit 2 for agitation purposes. When it is desired to pump the slurry from the pit, the motor-pump unit is lowered through operation of the winch 65 until the end 23 on the pump outlet 22 is automatically brought into registry with the end 13 of the pipe section. Operation of the pump will then discharge the slurry through the pipe section 12 to the exterior. As the slurry contains substantial quantities of fibrous material and solids, the pump 20 may tend to occasionally clog, and therefore it is desirable to conveniently remove the pump from the pit for maintenance or repair. With the invention, the motor-pump unit is initially raised to its uppermost position in the pit by operation of winch 65. In its uppermost position, as shown in FIG. 2, the key-way 30 on bracket 29 will be disengaged from the key 31 on the column 8. With the keyed connection disengaged, the motor-pump unit can then be rotated 90° and tilted about the trunion 44, either manually or through use of the crank mechanism previously described. Grating 34 can be removed from the top of the pit to enable the pump to be tilted. With the pump tilted to an above ground position, the motor-pump unit can then be manually rotated horizontally about the column 8 to a position transverse of the opening 36. The motor-pump unit is then lowered through operation of the winch 65 until the pump rests on the ground. In this position, the pump can be readily repaired or maintained.

Various modes of carrying out the invention are contemplated as being within the scope of the following claims particularly pointing out and distinctly claiming the subject matter which is regarded as the invention.

We claim:

1. An apparatus for agitating and pumping a liquid slurry, comprising a vessel containing the liquid slurry, a fixed vertical column disposed within said vessel, a motor-pump unit mounted for vertical movement on said column, said motor-pump unit including a pump located within the vessel for agitating and pumping the liquid slurry and a motor located a substantial distance above the pump and positioned outside the vessel, said motor-pump unit also including a driving connection between the motor and the pump, first mounting means for mounting the motor-pump unit for rotation about the axis of said column, and second mounting means connected to said motor-pump unit for mounting the motor-pump unit for tilting movement about a horizontal axis with respect to the column, said second mounting means being movable on said vertical column whereby said motor-pump unit can be moved vertically within said vessel, said motor-pump unit being movable to an upper position where the pump is located adjacent the top of the vessel and said motor-pump unit then being capable of being tilted about said horizontal axis to raise the pump to a level above the vessel.

2. The apparatus of claim 1, and including means for tilting said motor-pump unit about said horizontal axis.

3. The apparatus of claim 2, wherein said second mounting means comprises a guide member mounted for sliding movement on said column.

4. The apparatus of claim 3, wherein said second mounting means comprises a trunion including a socket member connected to one of said motor-pump unit and said guide member and a shaft member mounted for rotation within said socket member and connected to the other of said motor-pump unit and said guide member, said tilting means comprising a crank arm connected to one of said members and a lead screw threadedly engaged with said crank arm and pivotally connected to the other of said members whereby threading of said lead screw will move said crank arm to thereby cause tilting motion of said motor pump unit.

5. An apparatus for agitating and pumping a liquid slurry, comprising a pit containing a liquid slurry a fixed vertical column disposed within said pit, a motor-pump unit mounted for vertical movement on said column, said motor-pump unit including a pump located within the pit for agitating and pumping the liquid slurry and a motor located a substantial distance above the pump and positioned outside the pit, said motor-pump unit also including a drive shaft connected between the motor and the pump and offset laterally from said column, first mounting means for mounting the motor-pump unit for rotation about the axis of said column, a guide member mounted for vertical movement on said column, and trunion means interconnecting said guide member and said motor-pump unit for mounting said motor-pump unit for tilting movement in a vertical plane with respect to said guide member, movement of said guide member on said column causing said pump to move vertically within said pit.

6. The apparatus of claim 5, and including means for preventing relative rotation between said motor-pump unit and said column, and said first mounting means comprises journalling means for journalling said column for rotation about its axis, rotation of said column effecting corresponding rotation of said motor-pump unit about said axis.

7. The apparatus of claim 6, wherein said means for preventing relative rotation comprises a keyed connection between said motor-pump unit and said guide member, said keyed connection terminating short of the uppermost position of said pump, whereby the keyed connection will be disengaged when the pump is in its uppermost position to thereby permit said motor-pump unit to be tilted about said trunion means.

8. An apparatus for agitating and pumping a liquid slurry, comprising a pit containing a liquid slurry, a fixed vertical column disposed within said pit, a motor-pump unit mounted for vertical movement on said column, said motor-pump unit including a pump located within the pit for agitating and pumping the liquid slurry and a motor located a substantial distance above the pump and positioned outside the pit, said motor-pump unit also including a driving connection between the motor and the pump, first mounting means for mounting the motor-pump unit for rotation about the axis of said column, guide means for mounting said motor-pump unit for vertical movement on said column, trunion means interconnecting said guide means and said motor-pump unit for mounting said motor-pump unit for tilting movement in a vertical plane with respect to said column, locking means for preventing said motor-pump unit from being tilted about said trunion means, and means responsive to said pump being in an upper position adjacent the top of the pit for disengaging said locking means to thereby permit said motor-pump unit to be tilted about said trunion means.

9. An apparatus for agitating and pumping a liquid slurry, comprising a pit to contain the liquid slurry, a vertical column mounted in the pit, a motor-pump unit including a pump disposed in the pit for agitating and pumping the liquid slurry and a motor disposed a substantial distance above the pump and located upwardly of the pit, said motor-pump unit also including a driving connection between the motor and the pump, first mounting means for mounting said motor-pump unit for sliding vertical movement with respect to the column whereby the pump can move between a lower portion at the bottom of the pit to an upper position at the top of the pit, releasable connecting means for preventing relative rotation between said motor-pump unit and said column, second mounting means for mounting said motor-pump unit for rotation about a vertical axis, third mounting means for mounting said motor-pump unit for tilting movement about a horizontal axis relative to said column, and means responsive to the pump being moved to said upper position for releasing said connecting means whereby said motor-pump unit can be tilted about said horizontal axis to move said pump out of said pit.

10. The apparatus of claim 9, and a cover to enclose the top of the pit and having an opening to receive said column and said motor-pump unit, said cover being connected to said motor-pump unit whereby rotation of said motor-pump unit will cause rotation of said cover.

11. The apparatus of claim 9, and including a discharge pipe disposed at the lower end of the pit and connected to a disposal site, said pump having an inlet and an outlet, and means for automatically connecting said outlet to said discharge pipe when the pump is moved to its lower position.

12. The apparatus of claim 11, wherein said discharge pipe is provided with a wedge-shaped groove and the outlet of the pump is provided with a wedge-shaped end disposed to be received within said groove as the pump is moved to its lower position to connect said outlet to said discharge pipe.

* * * * *